Figure 1:
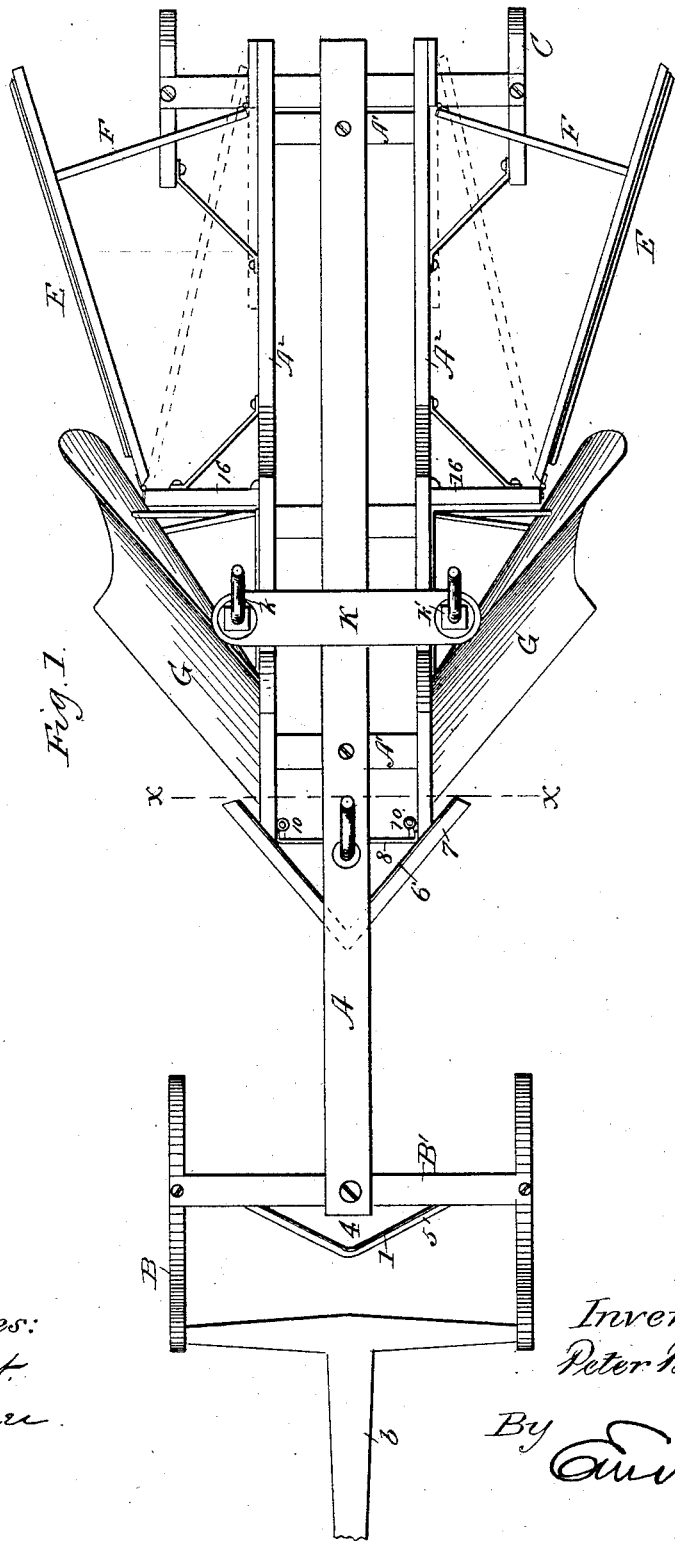

(No Model.) 2 Sheets—Sheet 1.

P. B. BRAZEL.
SNOW PLOW.

No. 367,694. Patented Aug. 2, 1887.

Witnesses:
J. R. Stuart,

Inventor:
Peter B. Brazel.
By Emmarble
Atty.

(No Model.) 2 Sheets—Sheet 2.
P. B. BRAZEL.
SNOW PLOW.
No. 367,694. Patented Aug. 2, 1887.
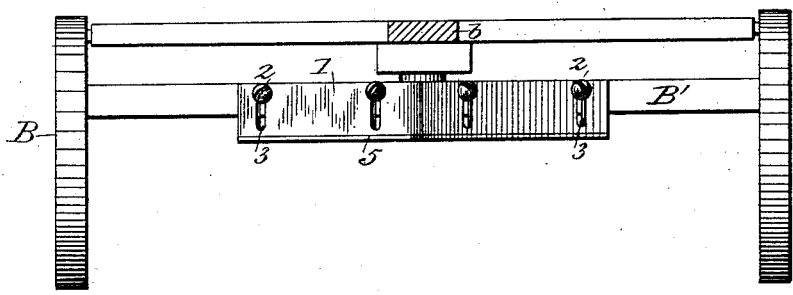
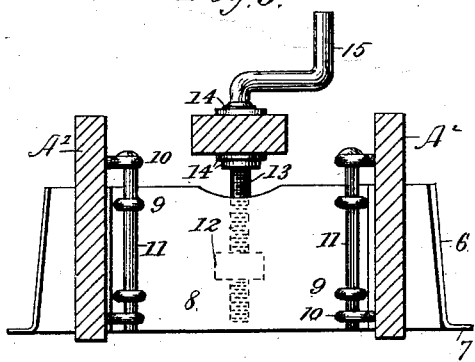
Witnesses:
Inventor:
Peter B. Brazel,

UNITED STATES PATENT OFFICE.

PETER BRADFORD BRAZEL, OF CHEBOYGAN, MICHIGAN.

SNOW-PLOW.

SPECIFICATION forming part of Letters Patent No. 367,694, dated August 2, 1887.

Application filed December 18, 1886. Serial No. 221,937. (No model.)

*To all whom it may concern:*

Be it known that I, PETER BRADFORD BRAZEL, a citizen of the United States, residing at Cheboygan, in the county of Cheboygan and State of Michigan, have invented certain new and useful Improvements in Snow-Plows; and I do hereby declare the following to be a full, clear, and exact description of the invention, such as will enable others skilled in the art to which it appertains to make and use the same.

My invention relates to snow-plows; and it consists in the construction and arrangement of the parts of the same, which will be more fully hereinafter described, and pointed out in the claims.

This invention is an improvement on Patent No. 298,441, granted to me May 13, 1884.

One object of my present invention is to provide a snow-plow having suitable plows arranged in the forward and central parts thereof, the forward plow being attached to the front bob-sled and adapted to cut away the upper layer or crust of snow, and to cut down, if required, the snow in the center of the road, and the next plow, attached to the central beam ahead of suitable mold-boards, cleaning the snow away from the cut made by the first plow to the ground, and also to cut down the snow in the center of the road, when required, said plows being raised or lowered, when desired.

A further object of my invention is to provide a snow-plow having an extreme forward plow attached to one of the bob-sleds and a central plow mounted on the central beam, the said latter cleaning away the snow below the cut of the forward plow and having mold-boards arranged just in the rear of the central plow and wings in the rear of the mold-boards adapted to be thrown out and extend the upper rear part of the said mold-boards, all of the said plows and mold-boards being adjustably mounted and the wings thrown outward or inward, as may be desired.

A further object of my invention is to provide a snow-plow which is simple and effective in its construction and operation, strong and durable, easily handled, readily understood, and positive in its desired use and ultimate result.

I attain these objects by the mechanism illustrated in the accompanying drawings, wherein like letters and figures of reference indicate similar parts in the several views, and in which—

Figure 1 is a top plan view of my improved snow-plow. Fig. 2 is a front elevation of the forward bob-sled, showing the plow arranged in connection therewith. Fig. 3 is a cross-sectional view on the line $x\ x$ of Fig. 1, looking toward the front of the plow.

The front and rear bob-sleds, B and C, the plows or mold-boards G G, the cross-bar K, and screw-rods and nuts $k\ k'$, the wings E E, and the hinged strips F F are features of construction common to my patent aforesaid, and need not be enlarged upon herein.

My improvement on said patent consists, essentially, of a central beam, A, secured to the front and rear bob-sleds, B and C, and to cross-bars A' of the side beams, $A^2\ A^2$, of the frame-work of the sled. The beam A is pivotally connected to the cross-bar B', of the front bob-sled, B, so that the said sled or runner may be turned to guide the plow entire. A suitable tongue, $b$, is also connected to said sled, to which suitable draft power may be attached.

To the front portion of the cross-beam B' of the bob-sled B a small plow, 1, is mounted and secured by bolts 2 2, engaging with slots 3 3, whereby the said plow may be raised or lowered, as may be desired. This plow 1 is constructed triangular in shape and has bearing-surface upon a triangular strip, 4, secured to the cross-beam B', being also provided with a projecting metal flange, 5, at its lower portion, and is adapted to cut or clean away the upper layer or crust of snow and to cut down and remove the snow or ice in the center of the road. On the forward ends of the side beams, $A^2$, which are suitably cut away, a plow, 6, is mounted, which is also triangular in shape and extends somewhat outward beyond the ends of the said side beams, $A^2$, and mold-boards G G, arranged in the rear thereof. The plow 6 has a metal flange, 7, formed at its lower portion, and in the inner portion thereof a strip, 8, connecting the two sides, is mounted, which has a series of eyes, 9 9, secured thereto. To the inner sides of the beams $A^2$, adjacent to the plow 6, and registering with the eyes 9, another series of eyes, 10 10, is secured, bolts or pins 11 11 passing through the eyes 9 and 10, and thereby holding the said plow 6 in connection with the frame of the snow-plow and at the same time allowing an easy raising and lowering motion of the plow 6, the eyes 9 and 10, in connection with the pins 11, acting as guides therefor. On the other side of the strip 8 a screw-threaded boss, 12, is secured or formed integral with the strip 8, and is engaged by a screw-threaded rod, 13, which extends up through the beam A, having clamping-nuts 14 on each side thereof, the said rod having an operating-handle, 15, formed at the upper part thereof, above the said beam. By this means the plow 6 may be raised or lowered, as desired, the inner part of the plow, where the strip 8 is secured to the sides thereof, forming a guideway engaging with the forward ends of the beams $A^2$ for steadying the plow in its motion.

In this improvement the wings E E are arranged somewhat differently than in my patent aforesaid, in that they are adapted to extend the rear upper portions of the plows or mold-boards G, and to accomplish this strips 16 16 are secured to the beams $A^2$ in back of the rear portions of the said mold-boards, extending outward some distance from said beams at right angles. To the upper portions of the said strips 16 the wings E E are hinged and are made of such length as to considerably extend the upper rear portions of the mold-boards, as hereinbefore stated.

The forward plow, 1, cuts away the upper crust of snow or ice in the center of the road, and the plow 6 cleans from the top of the cut made by plow 1 down to the surface of the ground, or may be used independently of plow 1. The snow forced back by the plow 6 is thence taken up by the mold-boards G G and turned off to one side. What snow may tend to spread out over the rear ends of the mold-boards G G is then taken up by the wings E E and carried along and thrown out on each side of the plow. These wings E also act to clear or shove back the top layer of the snow turned to one side by the mold-boards G G, which prevents a falling in of the snow back into the cleaned track.

The operation of the other parts of the plow is well understood, being fully described in my aforesaid patent.

It is obvious that various changes in the construction and arrangement of the parts of the device could be made and substituted for those shown and described without in the least departing from the nature and principle of my invention.

Having thus described my invention, what I claim as new, and desire to secure by Letters Patent, is—

1. In a snow-plow, the combination, with a central supporting-beam having a bob-sled secured at each end thereof, of a forward adjustable plow mounted in connection with the front bob-sled, substantially as described.

2. In a snow-plow, the combination, with a central supporting-beam having a bob-sled secured at each end thereof and to suitable side beams, of mold-boards mounted in connection with the said side beams, extension-wings hinged in the rear of said mold-boards, and a supplemental plow, adapted to be raised and lowered, operating in conjunction with the central and side beams ahead of the mold-boards, substantially as described.

3. In a snow-plow, the combination, with a central supporting-beam having a bob-sled secured to each end thereof and to suitable side beams, said beams having mold-boards arranged on each side thereof and in connection therewith, of an independently-operating plow arranged in front of the said mold-boards and adapted to be raised and lowered, substantially as described.

4. In a snow-plow, the combination, with the central supporting-beam having bob-sleds at each end thereof and side beams supporting adjustable mold-boards, of an independently-operating plow arranged in front of the mold-boards, eyes secured to said plow registering with eyes secured to the said beams, a rod passing through said eyes, and a screw-threaded rod passing through the central beam and engaging with a screw-threaded boss on the plow, whereby the said plow may be raised or lowered, substantially as described.

5. In a snow-plow, the combination, with a central supporting-beam having bob-sleds B and C, secured to the ends thereof, and side beams, $A^2$, carrying adjustable mold-boards E E, of the plow 6, arranged just ahead of the said mold-boards, and the plow 1, mounted on and operating in connection with the front bob-sled, B, substantially as described.

In testimony whereof I affix my signature in presence of two witnesses.

PETER BRADFORD BRAZEL.

Witnesses:
E. Z. PERKINS,
GEO. P. HUMPHREY.